United States Patent
Beaton

(10) Patent No.: US 7,302,162 B2
(45) Date of Patent: Nov. 27, 2007

(54) MODULATION OF A VIDEO SIGNAL WITH AN IMPAIRMENT SIGNAL TO INCREASE THE VIDEO SIGNAL MASKED THRESHOLD

(75) Inventor: Richard J. Beaton, Burnaby (CA)

(73) Assignee: QDesign Corporation, Seattle, WA (US)

( * ) Notice: Subject to any disclaimer, the term of this patent is extended or adjusted under 35 U.S.C. 154(b) by 1025 days.

(21) Appl. No.: 10/219,891

(22) Filed: Aug. 14, 2002

(65) Prior Publication Data

US 2004/0033060 A1 Feb. 19, 2004
US 2005/0135789 A9 Jun. 23, 2005

(51) Int. Cl.
| H04N 5/91 | (2006.01) |
| H04N 5/00 | (2006.01) |
| H04N 7/01 | (2006.01) |
| H04N 7/167 | (2006.01) |
| G09C 5/00 | (2006.01) |

(52) U.S. Cl. .................. 386/94; 386/117; 386/131; 380/54; 380/201

(58) Field of Classification Search ............... 386/94, 386/117, 131; 380/54, 201, 203, 204, 205, 380/206, 207, 208, 210, 214; 390/221; 348/68, 348/70, 268, 269
See application file for complete search history.

(56) References Cited

U.S. PATENT DOCUMENTS

| 5,706,061 A | * | 1/1998 | Marshall et al. ............ 348/743 |
| 5,959,717 A | * | 9/1999 | Chaum ........................ 352/40 |
| 6,529,600 B1 | * | 3/2003 | Epstein et al. .............. 380/252 |
| 6,624,874 B2 | * | 9/2003 | Revelli et al. ................ 352/90 |
| 2001/0032315 A1 | * | 10/2001 | Van Overveld et al. .... 713/176 |
| 2002/0168069 A1 | * | 11/2002 | Tehranchi et al. .......... 380/235 |

FOREIGN PATENT DOCUMENTS

| WO | WO 99/67950 | 12/1999 |
| WO | WO 01/56279 A2 | 8/2001 |

* cited by examiner

Primary Examiner—Thai Q. Than
Assistant Examiner—Syed Y. Hasan
(74) Attorney, Agent, or Firm—Davis Wright; Tremaine LLP

(57) ABSTRACT

An impairment signal is introduced into an original visual signal, either electronically or optically, that is not noticeable in a display of the original visual signal but is noticeable in a copy made of the display by a camcorder or other camera, thereby discouraging the unauthorized recording of such displays. One application is to protect commercial movies against being copied in a theatre by a camcorder and distributed. In one form, the added impairment signal includes alternate transparent and dark regions moving across the screen or other display device. The degree of opacity of the dark regions and their speed of movement across the display are selected to make them unnoticeable in the theatre but highly noticeable in a camcorder copy of the movie that is made at a lower frame rate than that at which the movie is displayed.

30 Claims, 5 Drawing Sheets

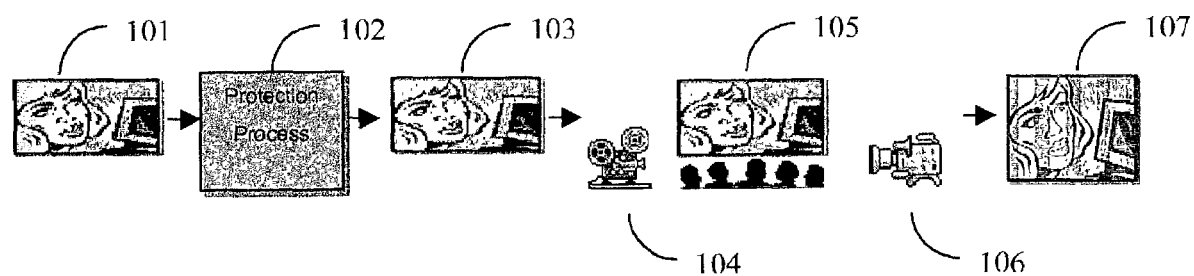
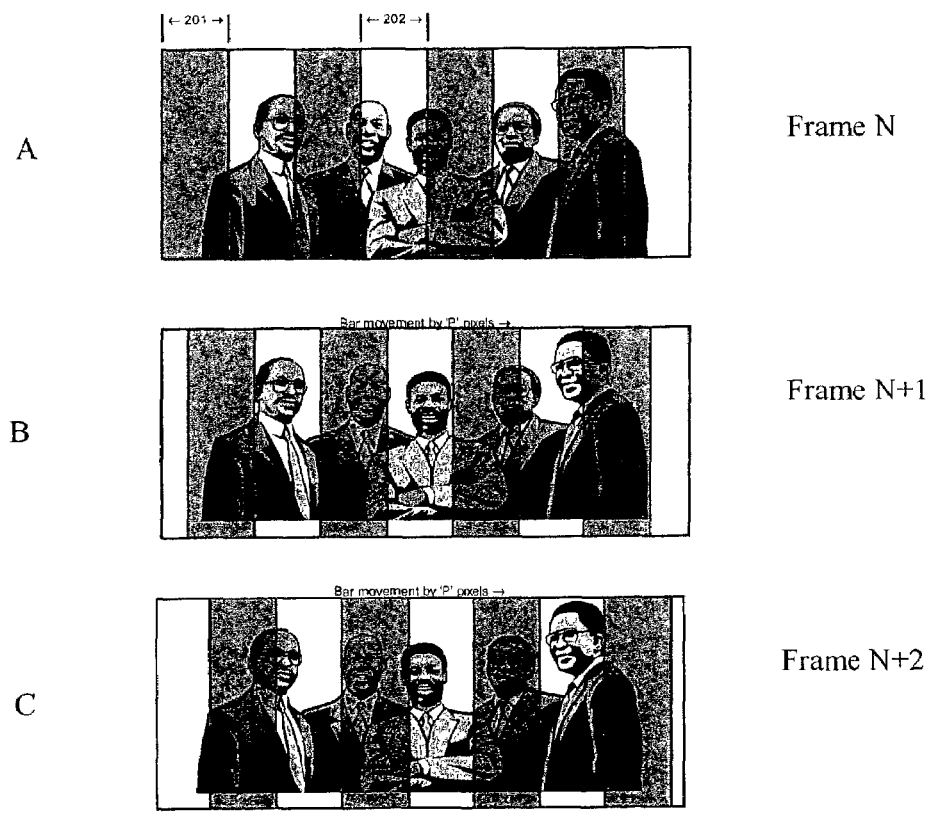
Figure 1
Figure 2
Frame N
Frame N+1
Frame N+2

MODULATION OF A VIDEO SIGNAL WITH AN IMPAIRMENT SIGNAL TO INCREASE THE VIDEO SIGNAL MASKED THRESHOLD

FIELD OF THE INVENTION

This invention concerns the protection of film and video releases from illicit recording and distribution. Specifically, this invention relates to providing a visual deterrent to the recording of images from a film or video screen by a video recording device, and the subsequent illicit redistribution of the recording.

BACKGROUND OF THE INVENTION

Owners of digital programming and content are increasingly reluctant to transmit their products unless digital media devices incorporate technologies to prevent them from being copied and widely disseminated without payment to the copyrights holders. Because digital content can be copied quickly, easily, and without degradation, digital programming and content owners face an exponentially increasing piracy threat. Digital Rights Management (DRM) systems have been developed which can control access to content which is in a digital file format, but these systems do not address the possibility of direct recording of the played-back content from a screen or output device. When the content is viewed by a consumer, it is converted to analog format, and DRM systems can no longer prevent unauthorized access to the content.

The revenue model of the film industry depends on a system of staged release, with films typically generating most revenue within the first few weeks of initial cinematic release. Subsequent releases in other regions and in other formats (DVD, broadcast pay-per-view) are delayed to maximize revenue from the cinematic release. Thus the most costly point at which film or video content is pirated is during the initial theatrical release. Hand-held or tripod-mounted video cameras are used by individuals to record motion picture films directly from theater screens. The recordings of these films are then copied onto blank videocassettes and encoded onto CDs and DVDs for illegal distribution. These illicit copies are widely distributed over the Internet and through physical channels even before the film's international cinematic release.

One method of cinematic release protection employs a visual watermark, or 'fingerprint' in the film to identify the source of the illicit copy. These transparent video watermarks may be inserted into the film image at the point of production or at the projection point, but the resulting content can still be recorded by a video camera without noticeable impairment. A watermark detector is employed to forensically analyze suspected pirated content for a watermark identifying the print and theater where the recording took place. Such a video watermark may survive the recording process and allow identification of the projector/theatre in which the recording took place, but it does not prevent the recording of the film or compression of the resulting video.

Many entertainment companies use encryption and copy protection technologies to protect their content against unauthorized distribution. Some delivery systems for film content already use some form of copy protection, including DVDs (which use the Content Scrambling System), video tapes and digital cinema systems, which employ digital encryption to protect the film from copying until it is projected on the screen. Although encryption and scrambling techniques can be effective in protecting against unauthorized copying of the digital stream or file, none of these systems can protect against the copying of the visual content as it is being viewed.

SUMMARY OF THE INVENTION

The present invention addresses the problem of protecting content from unauthorized duplication such as recording the output of a video display or cinema screen. The recording device is typically a camcorder operating at a fixed frame rate of approximately 24 to 30 frames per second. Present day analog projection systems operate at 24 frames per second, but new digital projection systems are capable of 60 frames per second or higher. In one exemplary embodiment of the present invention, an original video image signal is processed in a manner to output a protected signal. The processing modulates the original video image signal with a specially designed impairment signal to produce the protected signal. The impairment signal is designed to produce apparent motion when played back at a high frame rate, such that the impairment signal is effectively masked. That is, the apparent motion introduced by the impairment signal is not noticeable when the video signal is played back at the intended high frame rate, such as occurs in video theatres. When played back at a lower frame rate, however, such as the rate that an illicit recording from a video camcorder is played back, the impairment signal becomes visible. Thus the protected signal is visibly unimpaired when displayed on a cinema screen via projector, but when recorded and played back on a video camcorder, the resulting image is visibly impaired.

Although the description herein of an exemplary embodiments of the invention are presented in the context of a luminance component of a visual image signal, it will be understood that the invention applies equally to other image formats and domains, including alternate color spaces, luminance/chrominance and luminance/hue/saturation formats.

In one embodiment of the invention, an impairment signal is modified to fall just under the masked threshold of the input visual image signal. One method of doing this is to employ a psycho-visual masking model to calculate a Just Noticeable Difference (JND) profile for the original visual image signal and apply this JND profile to the impairment signal such the impairment signal is undetectable when added to the original visual image signal. For purposes of illustration, the impairment signal could be a series of still image frames with alternating light and dark bands.

The design of the impairment signal attempts to achieve sufficient apparent movement between frames to reduce visibility of the impairment signal at a high frame rate, with the frame rate chosen to cause visibility of the impairment signal when the combined signal is temporally downsampled to a different frame rate.

This exploits the 'picket fence' effect where a series of quickly moving lines or shapes will appear translucent such that an image behind the quickly moving lines or shapes becomes more visible. For example, when driving by a house with a picket fence, the house becomes more visible through the fence when moving at a higher rate of speed. The picket fence effect leads to an elevated masked threshold at the higher sample rate, which, when downsampled to a lower rate, will be reduced, thereby causing the previously masked impairment signal to become visible.

It is an advantage of the invention that it can be applied to a visual image signal at recording time, as part of the encoding process of protected digital media that are then distributed to theatres and the like for authorized viewing. It is also an advantage of the invention that it can be applied to the output of a film projector with little modification to the projector.

BRIEF DESCRIPTION OF THE DRAWINGS

FIG. 1 shows an example of the application of the present invention to the protection of a cinema display from unauthorized recording by a video camcorder.

FIGS. 2A-C show one example of a time-varying impairment signal and it's associated motion.

DESCRIPTION OF EXEMPLARY EMBODIMENTS

Figure 3:
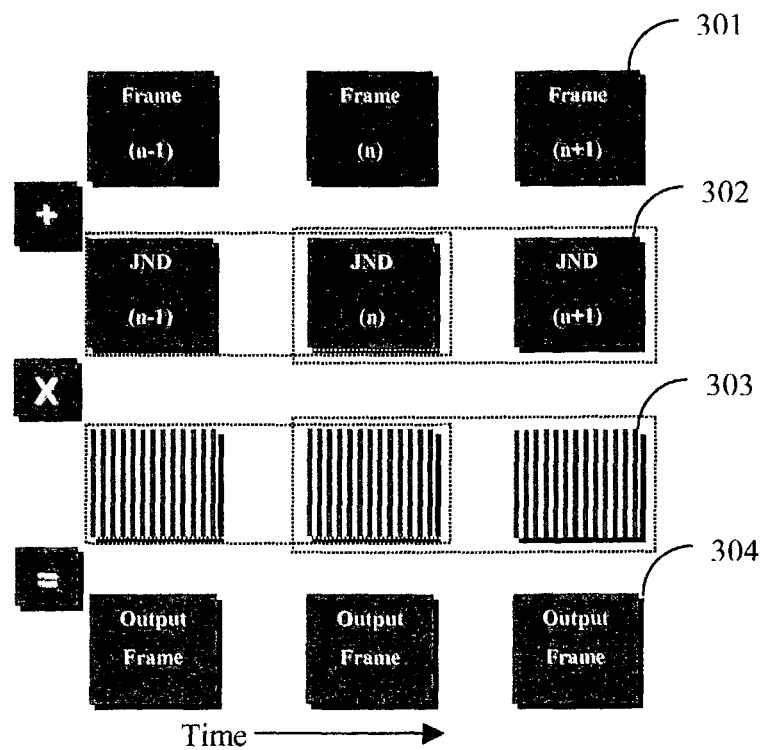
FIG. 3 shows the scaling of the impairment signal of FIGS. 2A-C by a psychovisual model-generated Just-Noticeable-Difference (JND) profile.

In the following detailed description of the invention, reference is made to the accompanying drawings, which form a part hereof, and in which is shown, by way of illustration, specific examples in which the invention may be practiced. It is to be understood that other embodiments may be utilized and structural changes may be made without departing from the scope of the present invention. While the present invention is described in terms of the media having video or moving image content, it is to be understood that the present invention is applicable to media having still image, and/or textual content, and that modifications can be made without departing from the scope of the present invention.

Typical video cameras record at a frame rate of 24 to 30 frames per second, which is the same range as typical analog and digital cinema projectors and other video technologies such as broadcast television and DVD. In some applications, for instance digital cinema projection, it is possible to modulate the output of the visual image at a much higher rate, either by modifying the internal display mechanism, or by processing the light before it is projected onto the screen. This is particularly enabled in newer spatial light modulators such as deformable mirror and grating light valve devices. These devices apply temporal modulation of individual elements of the spatial light modulator synchronized with colored light sources (such as color wheel or lasers) to achieve high resolution in color space.

The present invention exploits the higher frame rate display of the original visual image signal and the masking characteristics of the human visual system to modulate the projected output such that the modulation is imperceptible to viewers of the original content but will become visible when temporally re-sampled and played back at a lower frame rate. Inducing motion in the modulating signal to create a 'picket-fence' effect enhances the transparency of the modulation.

If a viewer looks through a picket fence from a fixed position, about half the scene behind the fence will be hidden from view and the pickets will be clearly visible in the foreground. However, if the viewer moves rapidly in relation to the fence (e.g. by driving by in a car), the perception will be of seeing the entire scene, even though half the scene will be missing at any given instant. The pickets will also become less noticeable. The human visual system is capable of reconstructing the background scene from the stream of partial views and of disregarding the sampling scheme imposed by the (relatively moving) pickets. In principle, this effect can be employed to introduce a signal which is invisible when sampled at a high rate (for instance by a digital online video display or cinema projector), but which becomes visible when the signal is re-recorded via hand-held camera at a different sample rate. If the camera sample rate is non-synchronous with the frame rate of the displayed video, additional artifacts will become visible.

FIG. 1 shows a general application of an exemplary embodiment of the present invention. An original video image signal 101 is processed through the present invention 102 to output a protected signal 103. This signal is visibly unimpaired when displayed on a cinema screen 105 via projector 104, but when recorded and played back on a video camcorder 106, the resulting image 107 is visibly impaired.

The technique can be demonstrated by moving a series of bars of increased luminance across the viewing area using a still image as background, as shown in FIG. 2. Shaded areas indicate areas of enhanced luminance, applied to fall just above the JND when the bars are viewed as a still image. The width of the 'On' region (201) and 'Off' region (202) or duty cycle (ratio of On/Off) as well as the 'speed' of motion of the bars across the image can be adjusted to achieve the best visibility/effectiveness tradeoff. The bars should be wide enough to be objectionable if unmasked by downsampling but narrow enough to be effectively masked by the 'picket fence' effect when viewing the original signal. The speed of movement should be as fast as possible to achieve transparency. At a frame rate of 60 fps, for instance, the bars could move at least ⅓ of their width each frame to achieve a reduced masking effect. Moving the bars at 100% of their width in each frame, with a 100% duty cycle ('ON'='OFF' width), will achieve an alternation of patterns. In the three consecutive video frames of FIGS. 2A-C, the bar pattern of the introduced signal is moved to the right a P number of pixels of the original display between each frame.

The general model for application of the technique includes a time-varying impairment signal, a psycho-visual masking model which produces a "Just-Noticeable Difference" (JND) map, and the combination of the original frame with the impairment signal frame scaled by the JND map.

Figure 4:
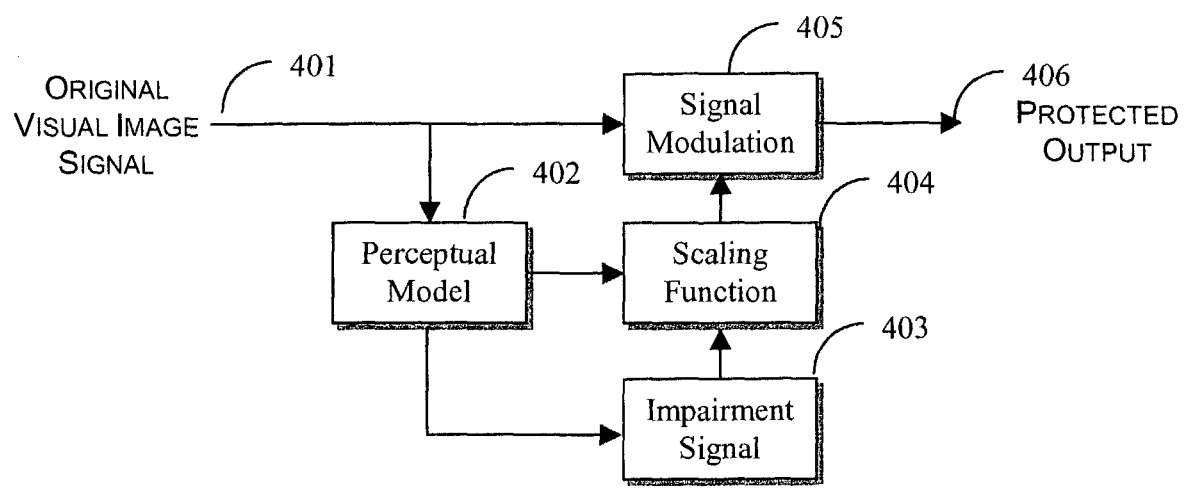
FIG. 4 shows an overview of the method of generating an impairment signal and combining a scaled version of the impairment signal with an original visual image signal.

In one embodiment, the impairment signal is applied to the original video signal as part of the production or authoring process. As shown in FIG. 3, a time-varying impairment signal 303 is created, in this case a series of vertical lines which move from frame to frame. The original video signal is sampled at a high enough frame rate (different from the assumed frame rate of a digital video camera) to allow motion in the impairment signal to become invisible to the viewer. This impairment signal is shaped to fall below the visible threshold by multiplying it by the JND profile 302 for the current frame 301, and added to the current frame 301 to produce the protected output signal 304. FIG. 4 shows a high-level structure of the method of applying the JND to the original signal. A psychovisual perceptual model 402 determines the JND profile through an analysis of the original visual image signal 401. The output of this perceptual model is used to select a suitable impairment signal, matched to the characteristics (including motion, texture, and color) of the original signal 401. The impairment signal 403 is scaled by the JND profile of the perceptual model 402 and used to modulate the original image signal to produce the protected output signal 406.

The impairment signal is designed to achieve apparent motion between frames at a rate sufficient to cause visibility when temporally downsampled to a different frame rate to create a 'picket fence' effect where a series of quickly moving lines will become translucent such that an image behind the quickly moving lines becomes more visible. For example, when driving by a house with a picket fence, the house becomes more visible through the fence when moving at a higher rate of speed. The picket fence effect will cause an elevated JND at the high sample rate, which when downsampled to a lower rate will be reduced, causing the previously masked modifying signal to become visible.

Note that while vertical lines are used as an impairment signal for illustration, an impairment signal may be composed of any content, and may be inserted and moved in either the vertical or horizontal dimension, or a combination of both directions. The motion can be fixed or pseudo-random and may be controlled by the original visual image signal characteristics. In addition to computing the JND profile for a given frame, the psychovisual model can also provide an output to drive the selection and design of the impairment signal 403. In this first embodiment of FIGS. 3 and 4, the impairment signal is made to be part of the video signal that is distributed and displayed in theatres and the like.

Figure 5:
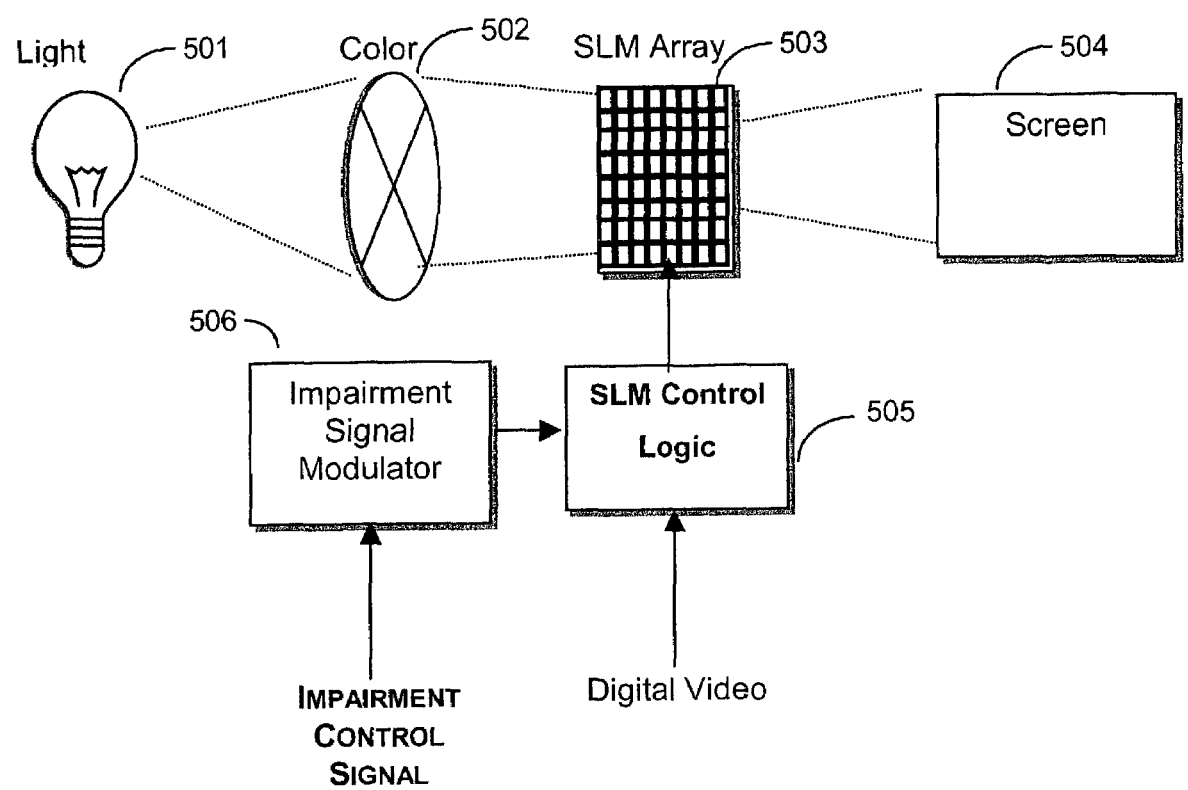
FIG. 5 shows an application of the present invention to the projection of an original image signal using a spatial light modulator (SLM) array.

In a second embodiment illustrated in FIG. 5, information on how to generate the impairment signal may be embedded in, or derived from, the original signal digital video bit stream, or carried as a separate control bit stream or file. This information is interpreted at the projection or display point, and a compatible decoder applies the impairment signal to the video signal at the point just before the video signal is converted to a visible form. This embodiment allows integration of the invention with a digital cinema projector, to directly control the amount of light applied to the screen. FIG. 5 shows the present invention applied to the modulation of display or projection systems known as spatial light modulator (SLM) systems. Examples of these systems, which may be analog or digitally controlled, include liquid crystal display devices, plasma display panels, actuated mirror arrays, and deformable mirror devices. The system shown in FIG. 5 employs a light source 501, shining through a rotating color wheel 502, onto a SLM 503, such as a deformable mirror device (DMD) array, which then reflects light onto a screen or display 504. The deformable mirror device consists of an array of tiny mirrors which are deformed to change their reflectivity under control of a SLM control logic block 505, which may be implemented either with standard central processing units or custom logic. The SLM control block modulates the reflectivity of the DMD array in synchrony with the color wheel rotation to produce spatial patterns and colors. Typically each pixel in the DMD array is modulated many times per frame to implement a high color resolution: the intensity of each color at each pixel is a function of the duty cycle of the modulation.

The present invention applies an impairment signal from a block 506 to the control logic block 505 to alter the modulation of the SLM array in accordance with the impairment signal characteristics. The pulse widths and patterns of each pixel control signal are modified to alter the brightness of a given pixel according to the intensity of the corresponding pixel location and frame of the impairment signal. By synchronizing this modulation with the rotation of the color wheel, modulation in the luminance/chrominance or discrete color space domain can be achieved, and moving patterns can be overlaid on the original visual image signal. Apparent movement in the impairment signal can be achieved at a higher frame rate than the original visual image signal by rapid modulation of the pixel intensities.

Figure 6:
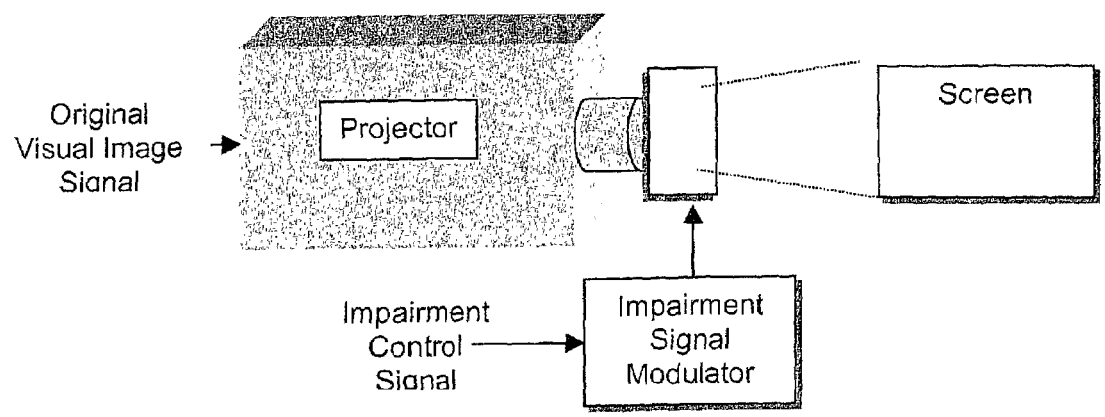
FIG. 6 shows an application of the present invention to the output of a projection system.

Rather than combining the impairment signal with the video signal being displayed, a third embodiment, shown in FIG. 6, applies the impairment signal at the output lens of the projector. An electronic device, such as a liquid crystal device (LCD) shutter, which is capable of modulating the opacity of the projected video signal, is attached to the projector lens or optical output device. The impairment signal is applied to the device in such a manner that the device admits more or less light in various spatial regions, depending on the intensity of the ACT signal. The device is capable of modulation at a high rate of speed, for example 60 or more frames per second, and need not be the same frame rate as the original visual image signal.

Figure 7:
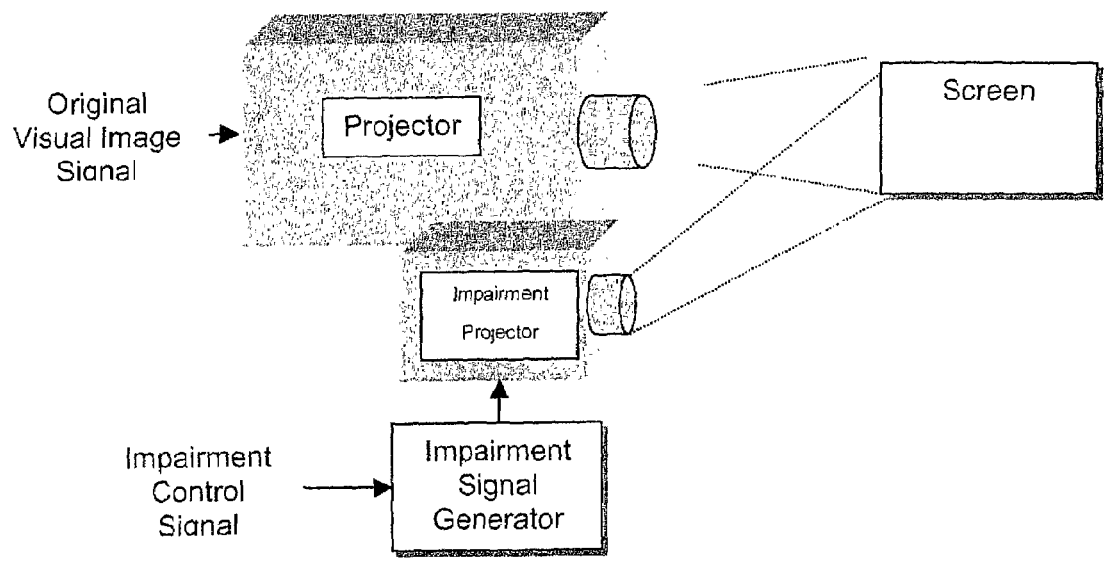
FIG. 7 shows an application of the present invention to a cinema projection system using a separate impairment signal projector.

In a fourth embodiment, FIG. 7 shows a combination of the impairment signal with the original visual image signal through the active projection of the impairment signal superimposed on the screen with the original visual image signal. The video output of the impairment projector is overlaid on the screen to modulate the amount of light and color presented to the viewer. As with the previous embodiments, information on how to generate the impairment signal may be embedded in the original signal digital video bit stream, carried as a separate control bit stream or file, or generated in real time from an analysis of the original signal during playback.

Figure 9:
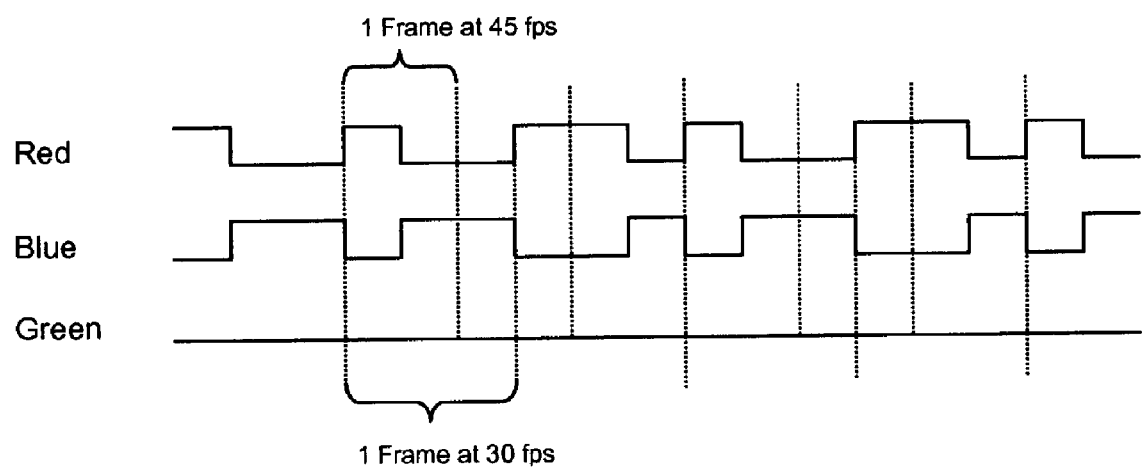
FIG. 9 shows the modulation of individual color signals to produce screen color.

A moving color pattern may alternatively be generated with a SLM 503 (FIG. 5) of a type that creates a particular color of the individual projected pixels by directing light of different primary colors passing through the color wheel 502 for relative proportions of the duration of a video frame. The relative duration of 'on' times for each color signal during a given frame determines the color perceived by the viewer who integrates the projected primary colors over the period of a frame or more. FIG. 9 shows a simplified timing diagram of such temporal modulation to achieve an intermediate color between red and blue, namely violet. Each color signal is heavily oversampled to implement a given bit depth in each color. For purposes of illustration, the signal shown in FIG. 9 is oversampled by a factor of two. The duty cycle has been designed to produce the pattern in time: Red, Blue, Blue, Red, Red, Blue, . . . etc. That is, the duration of one original projected image frame at an example 45 frames per second (fps) is divided into two time intervals, red and blue each being on for one of the two intervals of the individual frames, in order to form the color violet in the projected image of a given pixel, in this example. But it is also shown in FIG. 9 that the duration of one frame of the slower camcorder at an example 30 fps is divided into three time intervals, and that the pixel of each camcorder frame does not receive the colors red and blue for an equal time.

Figure 8:
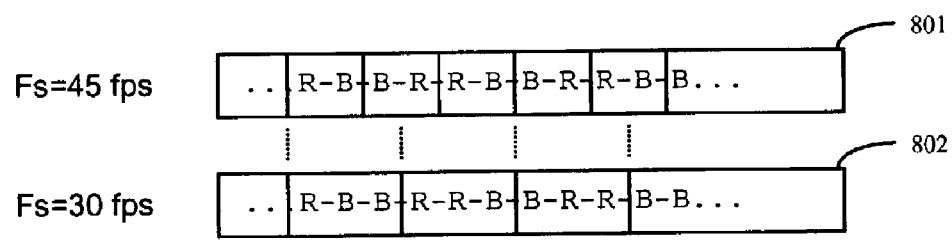
FIG. 8 shows the effect on reproduced color of re-sampling the original visual signal at a lower frame rate.

FIG. 8 also demonstrates the effect of sampling this signal at a lower frame rate. For purposes of illustration, the timing diagram 801 shows several frames (each frame bounded by vertical lines) of the projected display, at the frame rate of 45 fps. Red and blue colors are assumed to each be present for one-half the period of each frame, as indicated. The timing diagram 802 shows several frames of the recording camcorder, the frame rate being assumed to be 30 fps. The camcorder integrates over its frame period of 33 ms, which captures three time periods (one and one-half frames of the projected display) of the projector modulation rate. The camcorder then produces frames 802 which alternate between RBB/RRB/BRR/BBR/ etc., which does not produce the same visual color RR/BB/RR/BB of the original frames 801. FIGS. 8 and 9 show the method as applied to a single pixel of the visual image. Applying the method in a spatially correlated manner to groups of pixels can result in the reproduction of shapes in the reproduced visual image. This effect of downsampling on reproduced color is exploited to produce patterns in the video that become visible only upon downsampling the original visual signal.

This effect may be utilized to superimpose a moving 'fence' having pickets of colors not in the displayed image, with transparent spaces between them. The order in which each of the colors appearing in designated pixels during successive projected frames is altered for pixels displaying the fence pickets. This alteration is not visible in the original projected display but is visible in frames captured by a camcorder with its slower frame rate. In this way, a moving image may be generated and superimposed over the projected image that is not noticeable by a human viewing the projected image directly but is visible in a video captured by a camcorder or other recording device that operates at a slower frame rate than that being projected.

Although the present invention has been described with respect to several exemplary embodiments, it will be understood that the invention is entitled to protection within the full scope of the appended claims.

The invention claimed is:

1. A method of discouraging the recording of a display of a motion picture of image frames at a first frame rate by use of a video recording device that captures image frames at a second frame rate lower than the first frame rate comprising:
   adding an impairment image that moves across the display of the motion picture at a first speed sufficient to be unnoticeable at the first frame rate but which moves across a replay of the recording at the second frame rate that is noticeable by being slower than the first speed.

2. The method of claim 1, wherein the addition of the impairment image includes combining an electronic signal of the impairment image with an electronic signal of the motion picture display, thereby to display a combined signal.

3. The method of claim 2, wherein the combining the electronic signals of the impairment image and the motion picture display includes doing so prior to a time of the display of the motion picture.

4. The method of claim 2, wherein the combining the electronic signals of the impairment image and the motion picture display includes doing so at a time of the display of the motion picture.

5. The method of claim 1, wherein the addition of the impairment image includes optically combining the impairment image with the motion picture display, thereby to display the motion picture with the impairment image superimposed thereover.

6. The method of claim 5, wherein the optical combining of the impairment image with the motion picture display includes combining the impairment image and the motion picture into a single beam that is projected onto a display device.

7. The method of claim 5, wherein the optical combining of the impairment image with the motion picture display includes separately projecting the impairment image and the motion picture onto a display device.

8. The method of claim 1, wherein the impairment image includes alternate transparent and dark regions that are moved across the display.

9. The method of claim 8, wherein the alternate transparent and dark regions of the impairment image are moved horizontally across the display.

10. The method of claim 8, wherein the alternate transparent and dark regions include spatially sharp intensity changes between them.

11. The method of claim 8, wherein the dark regions of the impairment image are opaque.

12. The method of claim 8, wherein the dark regions of the impairment image are semi-transparent to a degree that causes the dark regions to be unnoticeable when moving across the display of the motion picture at the first speed.

13. A method of introducing a signal into an original visual image signal such that subsequent recording of the visual image by a camcorder or other visual recording device results in a visible impairment to the original visual image when played back or viewed after recording, comprising:
   a. generating a time-varying impairment signal designed to produce rapid apparent motion when applied at a high frame rate and less rapid apparent motion when viewed at a lower frame rate,
   b. scaling the time-varying signal according to a psychovisual model such that a resulting scaled time-varying signal is not noticeable when added to or used to modulate the original visual image signal, and
   c. adding the scaled impairment signal to the original visual image signal to produce a protected signal which has the same visual characteristics as the original visual image signal.

14. The method of claim 13 wherein the impairment signal is applied to one or more color planes in the color space domain of the original visual image signal.

15. The method of claim 13 wherein the impairment signal is applied to the luminance component of the original visual image signal.

16. The method of claim 13 wherein the impairment signal is applied to one or more chrominance or color-difference components of the original visual image signal.

17. The method of claim 13 where the impairment signal is applied at a higher frame rate than the original visual image signal, such that the time-varing nature of the impairment signal results in an elevated masked threshold of the impairment signal with respect to a non-time-varying version or reduced frame rate version of the impairment signal.

18. The method of any one of claims 13 through 17 wherein the impairment signal is shaped in the spatial domain so that the impairment signal is masked by the spatial characteristics of the original visual image signal.

19. An apparatus for introducing an impairment signal into an original visual image signal such that subsequent recording of the visual image by a camcorder or other visual recording device results in a visible impairment to the original visual image signal when played back or viewed after recording, comprising:
   a. a time-varying impairment signal generator designed to produce an impairment signal with rapid apparent motion when applied at a high frame rate and less rapid apparent motion when viewed at a lower frame rate, and which is scaled according to a psychovisual model such that the resulting scaled time-varying impairment signal is not noticeable when added to or used to modulate the original visual image signal, b. a modulator for combining said impairment signal with the original visual image signal at a high frame rate at the light-generating point of a display device, and c. a combiner of the output of said modulator to the light-generating portion of a cinema projector or display device to produce a protected signal which has the same visual characteristics as the original visual image signal.

20. The apparatus of claim 19 where the impairment signal generator applies the impairment signal to one or more color planes in the color space domain of the original visual image signal.

21. The apparatus of claim 19 where the impairment signal generator applies the impairment signal to the luminance component of the original visual image signal.

22. The apparatus of claim 19 where the impairment signal generator applies the impairment signal to one or more chrominance or color-difference components of the original visual image signal.

23. The apparatus of claim 19 where the impairment signal generator applies the impairment signal at a higher frame rate than the original visual image signal, such that the time-varying nature of the impairment signal results in an elevated masked threshold of the impairment signal with respect to a non-time-varying version or reduced frame rate version of the impairment signal.

24. The apparatus of any one of claims 19 through 23 wherein the impairment signal generator shapes the impairment signal in the spatial domain so that the impairment signal is masked by the spatial characteristics of the original visual image signal.

25. An apparatus for introducing an impairment signal into an original visual image signal such that subsequent recording of the visual image by a camcorder or other visual recording device results in a visible impairment to the original visual image signal when played back or viewed after recording, comprising:

a. a time-varying impairment signal generator designed to produce an impairment signal with rapid apparent motion when applied at a high frame rate and less rapid apparent motion when viewed at a lower frame rate, including scaling of the time-varying impairment signal according to a psychovisual model such that the resulting scaled time-varying impairment signal is not noticeable when added to or used to modulate the original visual image signal, b. a modulator for combining said impairment signal with the original visual image signal at a high frame rate at the light-generating point of a display device, and c. a time-varying spatial filter which may be controlled by said modulator and applied to the light output of a cinema projector or display device to produce a protected signal which has the same visual characteristics as the original visual image signal.

26. The apparatus of claim 25 where the signal generator applies the impairment signal to one or more color planes in the color space domain of the original visual image signal.

27. The apparatus of claim 25 where the signal generator applies the impairment signal to the luminance component of the original visual image signal.

28. The apparatus of claim 25 where the signal generator applies the impairment signal to one or more chrominance or color-difference components of the original visual image signal.

29. The apparatus of claim 25 where the signal generator applies the impairment signal at a higher frame rate than the original visual image signal, such that the time-varying nature of the impairment signal results in an elevated masked threshold of the impairment signal with respect to a non-time-varying version or reduced frame rate version of the impairment signal.

30. The apparatus of any one of claims 25 to 29 where the signal generator shapes the impairment signal in the spatial domain so that the impairment signal is masked by the spatial characteristics of the original visual image signal.

* * * * *